(12) United States Patent
Obermueller et al.

(10) Patent No.: US 12,442,893 B2
(45) Date of Patent: Oct. 14, 2025

(54) ON-CHIP REFLECTION COEFFICIENT MEASUREMENT SYSTEM

(71) Applicant: Infineon Technologies AG, Neubiberg (DE)

(72) Inventors: Thomas Obermueller, Linz (AT);
Andreas Schwarz, Öpping (AT);
Stefan Herzinger, Sauerlach (DE);
Bernhard Berger, Freistadt (AT);
Stefan Schmalzl, Sauerlach (DE);
Faisal Ahmed, Linz (AT); Muhammad Furqan, Linz (AT)

(73) Assignee: Infineon Technologies AG, Neubiberg (DE)

( * ) Notice: Subject to any disclaimer, the term of this patent is extended or adjusted under 35 U.S.C. 154(b) by 280 days.

(21) Appl. No.: 18/323,967

(22) Filed: May 25, 2023

(65) Prior Publication Data

US 2024/0393429 A1 Nov. 28, 2024

(51) Int. Cl.
*G01S 7/40* (2006.01)
*G01R 29/08* (2006.01)

(52) U.S. Cl.
CPC .......... *G01S 7/40* (2013.01); *G01R 29/0892* (2013.01)

(58) Field of Classification Search
CPC .......... G01S 7/40; G01S 7/032; G01S 7/4017; G01S 7/4021; G01S 13/343; G01R 29/0892; G01R 29/10; G01R 1/0416
USPC .......................................................... 324/612
See application file for complete search history.

(56) References Cited

U.S. PATENT DOCUMENTS

| | | | | | |
|---|---|---|---|---|---|
| 2,617,853 | A | * | 11/1952 | Gilmer | G01R 27/02 324/645 |
| 3,355,663 | A | * | 11/1967 | Aronoff | G01R 27/32 324/76.12 |
| 3,378,846 | A | * | 4/1968 | Lowenschuss | H01Q 3/46 343/703 |
| 4,359,682 | A | * | 11/1982 | Winslow | G01R 27/06 702/57 |
| 4,740,790 | A | * | 4/1988 | Hess, Jr. | G01R 23/16 342/361 |

(Continued)

OTHER PUBLICATIONS

Rocha, Armando, Susana Mota, and Carlos Ribeiro. "Software tools for teaching wave propagation in transmission lines [education corner]." IEEE Antennas and Propagation Magazine 59.3 (2017): 118-127. (Year: 2017).*

(Continued)

*Primary Examiner* — Christopher P McAndrew
(74) *Attorney, Agent, or Firm* — Harrity & Harrity, LLP

(57) ABSTRACT

A device may include a receive (Rx) antenna input to couple an Rx antenna to an Rx chain, and a signal coupler to inject the test signal toward the Rx antenna. The device may include an Rx antenna switch to, in a first switch state, cause the Rx antenna to be isolated from the Rx chain and, in a second switch state, permit the test signal to probe the Rx antenna. The Rx chain may measure a phasor of a first baseband signal generated based on a first reflected test signal and a phasor of a second baseband signal generated based on a second reflected test signal. The device may include a control circuit to compute a complex ratio based on the phasors, compute a measured reflection coefficient based on the complex ratio and using a transfer function, and monitor an impedance matching of the Rx antenna.

20 Claims, 11 Drawing Sheets

(56) References Cited

U.S. PATENT DOCUMENTS

| | | | | |
|---|---|---|---|---|
| 5,081,460 | A * | 1/1992 | Liu | H01Q 3/267 |
| | | | | 342/170 |
| 5,187,454 | A * | 2/1993 | Collins | H03H 11/30 |
| | | | | 333/32 |
| 6,924,698 | B2 * | 8/2005 | Camnitz | H03G 3/3042 |
| | | | | 330/285 |
| 8,004,269 | B1 * | 8/2011 | Franco | G01R 21/07 |
| | | | | 324/95 |
| 9,213,051 | B2 * | 12/2015 | Kusumoto | G01R 31/40 |
| 10,816,581 | B2 * | 10/2020 | Solomko | G01R 27/06 |
| 2003/0184319 | A1 * | 10/2003 | Nishimori | H03H 11/30 |
| | | | | 324/684 |
| 2006/0036382 | A1 * | 2/2006 | Paz | G01R 27/02 |
| | | | | 702/76 |
| 2006/0251160 | A1 * | 11/2006 | Fazlollahi | H04B 3/46 |
| | | | | 375/222 |
| 2007/0035356 | A1 * | 2/2007 | Ranta | H04B 1/18 |
| | | | | 333/17.3 |
| 2007/0129040 | A1 * | 6/2007 | Adlerstein | H01Q 3/30 |
| | | | | 455/260 |
| 2017/0179587 | A1 * | 6/2017 | Cohen | H01Q 9/005 |
| 2019/0108980 | A1 * | 4/2019 | van Zyl | H01J 37/32174 |

OTHER PUBLICATIONS

Slevin, Edward, et al. "Broadband electrically small VLF/LF transmitter via time-varying antenna properties." IEEE Transactions on Antennas and Propagation 70.1 (2021): 97-110. (Year: 2021).*

* cited by examiner

ON-CHIP REFLECTION COEFFICIENT MEASUREMENT SYSTEM

BACKGROUND

A radio frequency (RF) device, such as a radar monolithic microwave integrated circuit (MMIC), may need to evaluate a quality of a connection of an antenna in purposes of providing functional safety. Monitoring a quality of a connection of an antenna is particularly important for an application that utilizes an RF device in a vehicle, such as an advanced driver-assistance system (ADAS) application.

SUMMARY

In some implementations, a device includes a receive (Rx) antenna input to couple an Rx antenna to an Rx chain; a test signal generator to generate a test signal; a signal coupler to inject the test signal toward the Rx antenna; an Rx antenna switch configured to: cause, while in a first switch state, the Rx antenna to be isolated from an Rx chain to generate a first reflected test signal, and permit, while in a second switch state, the test signal to probe the Rx antenna to generate a second reflected test signal; the Rx chain configured to: measure a phasor $Y_1$ of a first baseband signal generated based on the first reflected test signal, and measure a phasor $Y_2$ of a second baseband signal generated based on the second reflected test signal; a control circuit configured to: compute a complex ratio CR based on the phasor $Y_1$ and the phasor $Y_2$, and compute a measured reflection coefficient $\Gamma_m$ based on the complex ratio CR and using a transfer function H, and monitor an impedance matching of the Rx antenna based the measured reflection coefficient $\Gamma_m$.

In some implementations, a method includes injecting, by a signal coupler, a test signal toward an Rx antenna; preventing, by an Rx antenna switch in a first switch state, the test signal from probing the Rx antenna to generate a first reflected test signal; permitting, by the Rx antenna switch in a second switch state, the test signal to probe the Rx antenna to generate a second reflected test signal; measuring, by a component of an Rx chain, a phasor $Y_1$ of a first baseband signal generated based on the first reflected test signal; measuring, by a component of the Rx chain, a phasor $Y_2$ of a second baseband signal generated based on the second reflected test signal; computing, by a control circuit, a complex ratio CR based on the phasor $Y_1$ and the phasor $Y_2$; computing, by the control circuit, a measured reflection coefficient $\Gamma_m$ based on the complex ratio CR and using a transfer function H; and monitoring, by the control circuit, an impedance matching of the Rx antenna based the measured reflection coefficient $\Gamma_m$.

In some implementations, a device includes an Rx antenna input to couple an Rx antenna to an Rx chain; a test signal generator to generate a test signal; a signal coupler to inject the test signal toward the Rx antenna; an Rx antenna switch configured to: cause, while in a first switch state, the Rx antenna to be isolated from an Rx chain to generate a first reflected test signal, and permit, while in a second switch state, the test signal to probe the Rx antenna to generate a second reflected test signal; the Rx chain configured to: measure a phasor $Y_1$ of a first baseband signal generated based on the first reflected test signal, and measure a phasor $Y_2$ of a second baseband signal generated based on the second reflected test signal; a control circuit configured to: apply a transfer function H to a result associated with measuring the phasor a phasor $Y_1$ and result of measuring the phasor $Y_2$, the transfer function H being dependent on channel characteristics of the device, and monitor the Rx antenna based on a result of applying of the transfer function.

DETAILED DESCRIPTION

Figure 1A:
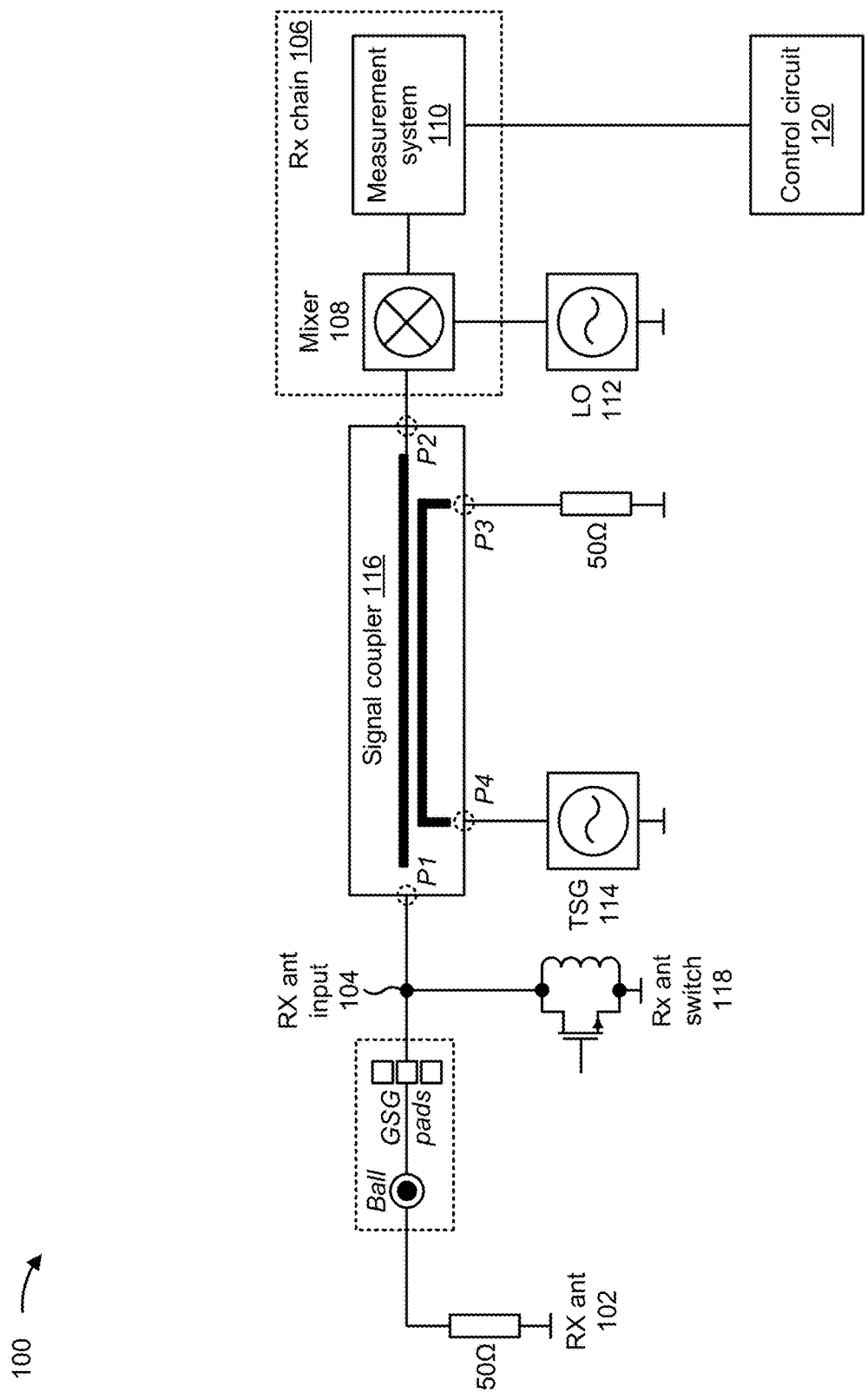
FIGS. 1A-1E are diagrams associated with an example implementation of an RF device comprising an on-chip measurement system for performing reflection coefficient measurement in association with monitoring an impedance matching of an Rx antenna.

The following detailed description of example implementations refers to the accompanying drawings. The same reference numbers in different drawings may identify the same or similar elements.

A radio frequency (RF) device, such as a radar monolithic microwave integrated circuit (MMIC), may need to evaluate a quality of a connection of an antenna. In a transmit (Tx) path, a measurement of an impedance of the antenna may be used to evaluate a quality of a connection of the antenna. Here, a reflection of a transmitted signal coming from the antenna can be used to detect the antenna impedance and, therefore, a quality of the connection from the Tx path to the antenna can be derived. However, there is no transmitted signal in a receive (Rx) path and, therefore, there is no reflected signal readily available to be used for evaluation of a connection in the Rx path. Rather, in the case of an Rx path, an RF device typically evaluates the quality of the connection of the antenna based on determining whether an RF ball of the RF device is connected to a circuit board of the RF device.

A safety requirement, such as a functional safety requirement in an automotive context, may require monitoring of a connection of an Rx antenna in an RF device. Conventionally, the connection of the Rx antenna is monitored using a ball break detection (BBD) technique. In general, the BBD technique is performed by forcing a direct current (DC) through the antenna connection, observing a relative change of voltage occurring on a series resistor, and then evaluating the connection based on the observed relative change of voltage. Notably, the BBD technique requires that there is no DC connection to ground in the RF device. However, a DC connection to ground may be needed, for example, to enable operation of an input balun or for protection from electrostatic discharge (ESD) in the RF device. Further, the BBD technique is limited to monitoring DC connectivity, and cannot provide any information regarding RF impedance. Additionally, because the BBD technique is based on a comparison of voltages, a result is dependent on process, voltage, and temperature (PVT) variation of a reference resistor and PVT variation of a reference current, thereby reducing reliability of the BBD technique.

Some implementations described herein provide techniques and apparatuses for an RF device comprising on-chip measurement system for performing reflection coefficient measurement in association with monitoring an impedance matching of an Rx antenna. In some implementations, the RF device includes an Rx antenna input to couple an Rx antenna to an Rx chain, a test signal generator to generate a test signal, and a signal coupler to inject the test signal toward the Rx antenna. Further, the RF device includes an Rx antenna switch configured to cause, while in a first switch state, the Rx antenna to be isolated from an Rx chain to generate a first reflected test signal, and to permit, while in a second switch state, the test signal to probe the Rx antenna to generate a second reflected test signal. The RF device may further include the Rx chain configured to measure a phasor $Y_1$ of a first baseband signal generated based on the first reflected test signal (e.g., while the Rx antenna switch is in the first switch state) and to measure a phasor $Y_2$ of a second baseband signal generated based on the second reflected test signal (e.g., while the switch is in the second switch state). The RF device may further include a control circuit configured to: compute a complex ratio CR based on the phasor $Y_1$ and the phasor $Y_2$, compute a measured reflection coefficient $\Gamma_m$ based on the complex ratio CR and using a transfer function H, and monitor an impedance matching of the Rx antenna based the measured reflection coefficient $\Gamma_m$. Additional implementations and details are provided below.

In some implementations, the RF device described herein is capable of monitoring an impedance matching of an Rx antenna. The monitoring of the impedance matching of the Rx antenna allows direct monitoring the Rx antenna connection based on the monitoring of the impedance matching. Notably, the RF device described herein does not rely on an open DC connection to ground, meaning that operation of an input balun can be enabled and protection from ESD can be provided. Further, the RF device described herein is capable of detecting an imperfect connection of an RF ball (e.g., as compared to the BBD technique, where only a complete disconnection can be detected). Furthermore, an impact on a front-end of the RF device described herein is minimized because no component needs to be added directly on the Rx path to enable the monitoring of the impedance matching of the Rx antenna or the monitoring of the Rx chain.

FIGS. 1A-1E are diagrams associated with a first example implementation of an RF device 100 comprising an on-chip measurement system for performing reflection coefficient measurement in association with monitoring an impedance matching of an Rx antenna. As shown in FIG. 1A, the RF device 100 may include an Rx antenna 102, an Rx antenna input 104, an Rx chain 106 comprising a mixer 108 and a signal processing component 110, a local oscillator (LO) 112, a test signal generator (TSG) 114, a signal coupler 116, an Rx antenna switch 118, and a control circuit 120.

The Rx antenna 102 includes an antenna to receive radio waves and produce an electrical signal (i.e., an RF signal). The Rx antenna 102 is coupled to the Rx antenna input 104 of the RF device 100, which enables the RF signal produced by the Rx antenna 102 to be provided to other components of the RF device 100 (e.g., the Rx chain 106) for signal processing. In the RF device 100, the Rx antenna 102 has an impedance of 50 Ohms (Ω), which is provided as an example of a possible impedance of the Rx antenna 102.

The Rx chain 106 includes one or more components and/or sub-components forming a receive chain of the RF device 100. For example, the Rx chain 106 may include the mixer 108, the signal processing component 110, and one or more other components. The one or more other components of the Rx chain 106 may include, for example, one or more amplifiers, one or more filters, one or more additional mixers, one or more attenuators, one or more detectors, or the like. Notably, one or more components of the RF device 100 shown in FIG. 1A as not being included in the Rx chain 106, such as signal coupler 116, may in some implementations be included in the Rx chain 106.

The mixer 108 includes a component to mix an RF signal with an LO signal in association with performing frequency conversion of the RF signal to another frequency, such as an intermediate frequency (IF) or a baseband frequency (e.g., by multiplying the RF signal and the LO signal). In some applications, the RF device 100 is a frequency modulated continuous wave radar device. In this implementation, a signal received by the Rx antenna 102 is converted by the mixer 108 into a baseband signal. This baseband signal can in some scenarios be further processed (external or internal) to generate a multi-dimensional map indicating distance and velocity of objects (e.g., a Range-Doppler map). In operation of the RF device 100 in association with performing Rx antenna impedance monitoring, the mixer 108 may be configured to down-convert a first reflected signal (e.g., an RF signal resulting from the test signal being injected toward the Rx antenna 102 while the Rx antenna switch 118 is in a first switch state) to generate a first baseband signal, and to down-convert a second reflected signal (e.g., an RF signal resulting from the test signal being injected toward the Rx antenna 102 while the Rx antenna switch 118 is in a second switch state) to generate a second baseband signal. In some implementations, the mixer 108 may convert a given RF signal to a baseband signal to enable further signal processing by the signal processing component 110 and/or the control circuit 120.

The signal processing component 110 includes one or more components associated with processing signals generated by the mixer 108 to perform measurements associated with monitoring an impedance of the Rx antenna 102, as described. For example, the signal processing component 110 may include an analog front end (AFE), one or more analog-to-digital converters (ADCs), a digital front end (DFE), or one or more filters (e.g., a fast Fourier transform (FFT) filter, a Goertzel filter, or the like), among other examples. In some implementations, the AFE may filter and/or process a given signal to create an amplified and filtered signal for conversion by the one or more ADCs. The one or more ADCs may convert the amplified/filtered signal from the analog domain to the digital domain. The DFE may process a digital signal provided by the one or more ADCs, and output a processed digital signal.

In some implementations, the signal processing component 110 may be configured to measure a phasor of a baseband signal output by the mixer 108. For example, the signal processing component 110 may measure a phasor $Y_1$ of a first baseband signal generated based on a first reflected test signal. That is, in operation, the signal processing component 110 may measure a phasor (i.e., an amplitude and a phase) of the first baseband signal that is provided by the mixer 108 while the Rx antenna switch 118 is in a first switch state. Similarly, the signal processing component 110 may measure a phasor $Y_2$ of a second baseband signal generated based on a second reflected test signal. That is, in operation, the signal processing component 110 may measure a phasor of the second baseband signal that is provided by the mixer 108 while the Rx antenna switch 118 is in a second switch state. In some implementations, the phasor Y of a baseband signal may be determined based on the formula:

$$Y = Ae^{j\varphi}$$

where A is the amplitude of the baseband signal, e represents Euler's number, j is the complex value equal to $\sqrt{-1}$, and $\varphi$ is the phase of the baseband signal.

In some implementations, the signal processing component 110 may provide a measurement signal that indicates a phasor (e.g., the amplitude and phase of the baseband signal) as measured by the signal processing component 110. In some implementations, the signal processing component may provide the measurement signal to the control circuit 120 for further processing so that the control circuit can perform operations associated with monitoring impedance matching of the Rx antenna 102 based on the measurement signal, as described herein.

The LO 112 includes an oscillator that provides the LO signal for mixing by the mixer 108. In some implementations, the LO 112 may be coupled to the mixer 108 such that the mixer 108 can use the LO signal to down-convert an RF signal to an IF signal or baseband signal, as described herein. In some implementations, the frequency of oscillation of the LO 112 may be fixed. Alternatively, the frequency of the LO 112 may be variable, meaning that the frequency of oscillation of the LO 112 can be controlled or modified (e.g., according to a control signal received from another component of the RF device 100). In some implementations, the frequency of oscillation of the LO 112 may be in a range from approximately _____ to approximately _____. In some implementations, the LO 112 may be configured or controlled such that a frequency of oscillation of the LO 112 ramps from a first frequency to a second frequency over a first period of time while the Rx antenna switch 118 is in the first switch state, and such that the frequency of oscillation of the LO 112 ramps from the first frequency to the second frequency over a second period of time while the Rx antenna switch is in the second switch state, as described in further below with respect to FIG. 2.

The TSG 114 includes a component capable of generating a test signal based on which a reflection coefficient at the Rx antenna 102 can be computed in association with monitoring the impedance matching of the Rx antenna 102, as described herein. In some implementations, the TSG 114 is coupled to a particular port of the signal coupler 116 (e.g., port P4 as shown in FIG. 1A). The signal coupler 116 may be a 4-port coupler, such as a directional 4-port coupler. In some implementations, a given test signal generated by the TSG 114 may be an RF signal. In some implementations, a frequency of a given test signal generated by the TSG 114 is greater than approximately 10 gigahertz (GHz). In some implementations, a frequency of a given test signal generated by the TSG 114 is within an operating range of the Rx antenna 102 (e.g., a frequency range in which the Rx antenna 102 is configured to operate, such as a frequency range in a range from approximately 76 GHz to approximately 81 GHz).

The signal coupler 116 includes a component to inject a test signal into one or more other components of the RF device 100. For example, in some implementations, the signal coupler 116 may be configured to inject a test signal toward the Rx antenna 102 (via the Rx antenna input 104).

In some implementations, as illustrated in FIG. 1A, the signal coupler 116 is electrically connected between the Rx antenna input 104 and the Rx chain 106. In some implementations, the first port of the signal coupler 116 (e.g., port P4 in FIG. 1A) is coupled to the TSG 114, and a second port (e.g., port P3 in FIG. 1A) is isolated (e.g., through a connection to a 50Ω load).

In some implementations, as illustrated in FIG. 1A, the signal coupler 116 is a four-port device. In such an implementation, a third port of the signal coupler 116 (e.g., port P1 in FIG. 1A) may be coupled to the Rx antenna input 104, and a fourth port of the signal coupler 116 (e.g., port P2 in FIG. 1A) may be coupled to the Rx chain 106. In some implementations, the signal coupler 116 includes a forward-wave coupled line directional coupler, a backward-wave coupled line directional coupler, a Lange coupler, a branch-line coupler, a rat-race ring coupler, or another type of directional coupler. In some implementations, the signal coupler 116 has a directivity that is greater than or equal to approximately 10 decibels (dB). The directivity of the signal coupler 116 is a parameter of the signal coupler 116 that determines a level of a signal propagating in an unwanted direction (e.g., in a direction toward the Rx chain 106 when the signal coupler 116 injects the test signal toward the Rx antenna 102). Therefore, in practice, a robustness or accuracy of the monitoring of the impedance matching of the Rx antenna 102 may be improved with a higher directivity of the signal coupler 116. In some cases, a signal coupler having a directivity of less than approximately 10 dB would result in a significant reduction in robustness.

Rx antenna switch 118 is a switch configured to selectively isolate the Rx antenna 102 from the Rx chain 106 in association with measuring the reflection coefficient of the Rx antenna 102, as described herein. For example, at a given time, the Rx antenna switch 118 may be controlled (e.g., based on a switch control signal) such that the Rx antenna switch 118 is in a first switch state (e.g., a closed state) or a second switch state (e.g., an open state). In this example, while in the first switch state, the Rx antenna switch 118 may cause the Rx antenna 102 to be isolated from the Rx chain 106. Here, the first switch state may create a connection to ground via the Rx antenna switch 118, which prevents the test signal from probing the Rx antenna 102 and, additionally, causes a substantial portion of the test signal (e.g., nearly the entire test signal) to be reflected back through the Rx antenna input 104 toward the signal coupler 116. The reflected test signal while the Rx antenna switch 118 is in the first switch state is herein referred to as a first reflected test signal. Conversely, while in the second switch state, the Rx antenna switch 118 may permit the test signal to probe the Rx antenna 102. That is, the second switch state may permit the test signal to reach the Rx antenna 102 through the Rx antenna input 104, which results in a non-substantial portion of the test signal (e.g., almost none of the test signal) to be reflected back through the Rx antenna input 104 toward the signal coupler 116. Rather, a substantial portion of power of the test signal would be dissipated by (e.g., transmitted by) the Rx antenna 102. The reflected test signal while the Rx antenna switch 118 is in the second switch state is herein referred to as a second reflected test signal.

Notably, a characteristic (e.g., a phasor, an amplitude, a phase, or the like) of a reflected test signal in the presence of an impedance mismatch (e.g., caused by a broken ball or other factor affecting impedance matching of the Rx antenna 102) while the Rx antenna switch 118 is in the second switch state would differ from the same characteristic of a reflected test signal in the presence of a perfect or near-perfect impedance matching of the Rx antenna 102 (e.g., when no ball break or other characteristics impacting impedance are present) while the Rx antenna switch 118 is in the second switch state. Therefore, the characteristic of the reflected test signal while the Rx antenna switch 118 is in the second switch state can be used in association computing the reflection coefficient of the Rx antenna 102 to enable monitoring of the impedance matching of the Rx antenna 102, as described in further detail below.

Control circuit 120 includes one or more components (e.g., one or more processors, a controller, a microcontroller, an electronic control unit, or the like) configured to perform operations associated with computing a reflection coefficient of the Rx antenna 102 and/or monitoring impedance matching of the Rx antenna 102, as described herein. For example, in some implementations, the control circuit 120 may compute a complex ratio CR based on the phasor $Y_1$ of the first reflected test signal and the phasor $Y_2$ of the second reflected test signal, and may compute a measured reflection coefficient $\Gamma_m$ based on the complex ratio CR and using a transfer function H. The control circuit 120 may then monitor the impedance matching of the Rx antenna 102 based the measured reflection coefficient $\Gamma_m$. Additional details regarding operation of the control circuit 120 and the transfer function H are described below.

Additionally, or alternatively, the control circuit 120 may in some implementations be configured to provide an error signal based on the monitoring of the Rx antenna 102. The error signal may indicate, for example, an indication that an impedance mismatch of the Rx antenna 102 has been detected. Thus, the error signal may be used to indicate a possible failure of the Rx antenna 102, a possible failure of a connection of the Rx antenna 102 (e.g., a ball break), a possible degradation of the Rx antenna 102, a possible degradation of a connection of the Rx antenna 102 (e.g., a partial ball break), or another issue that causes an impedance mismatch of the Rx antenna 102. In some implementations, the control circuit 120 may be included in another component of the RF device 100 or may be a discrete component of the RF device 100.

Figure 1B:
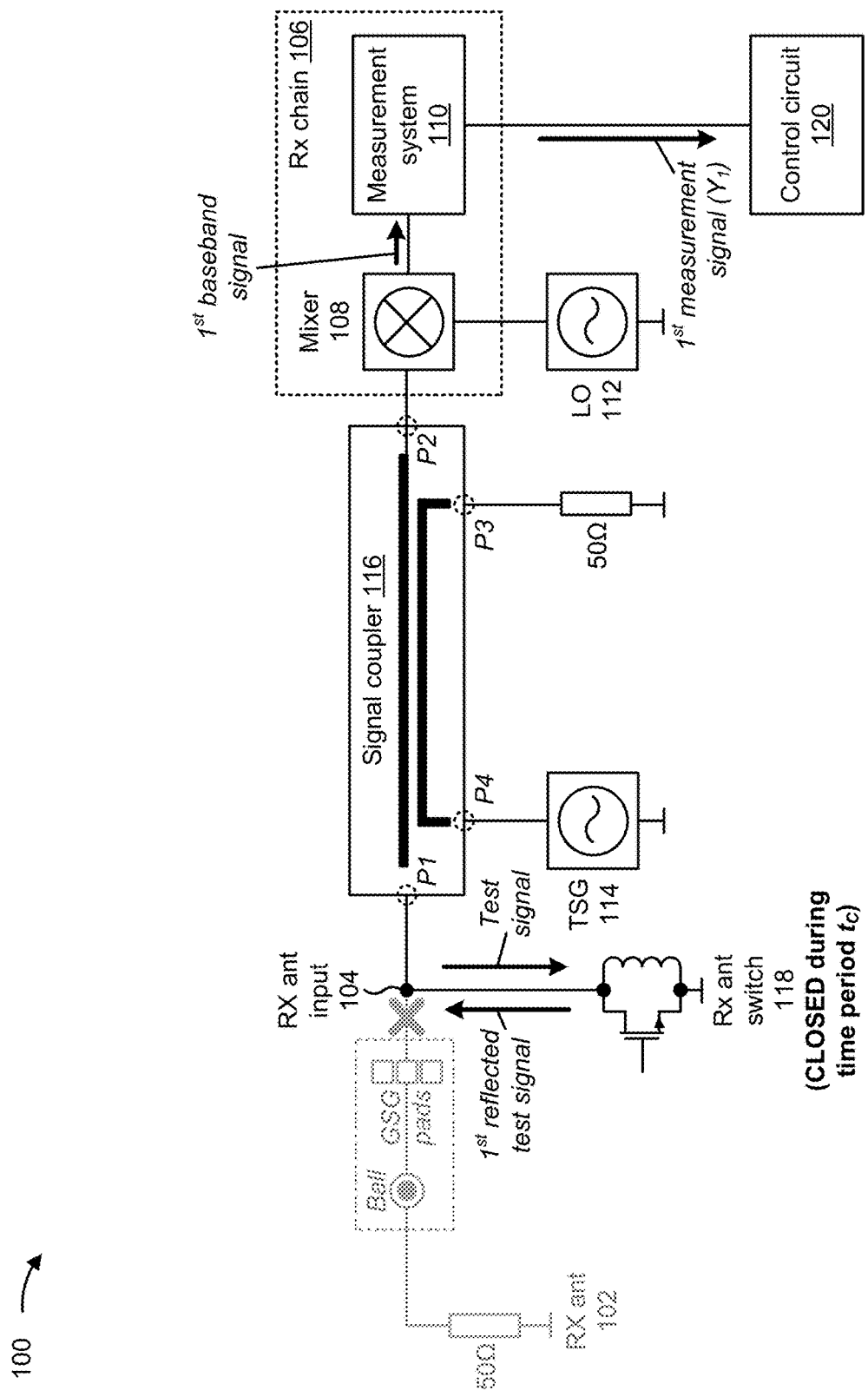
Figure 1C:
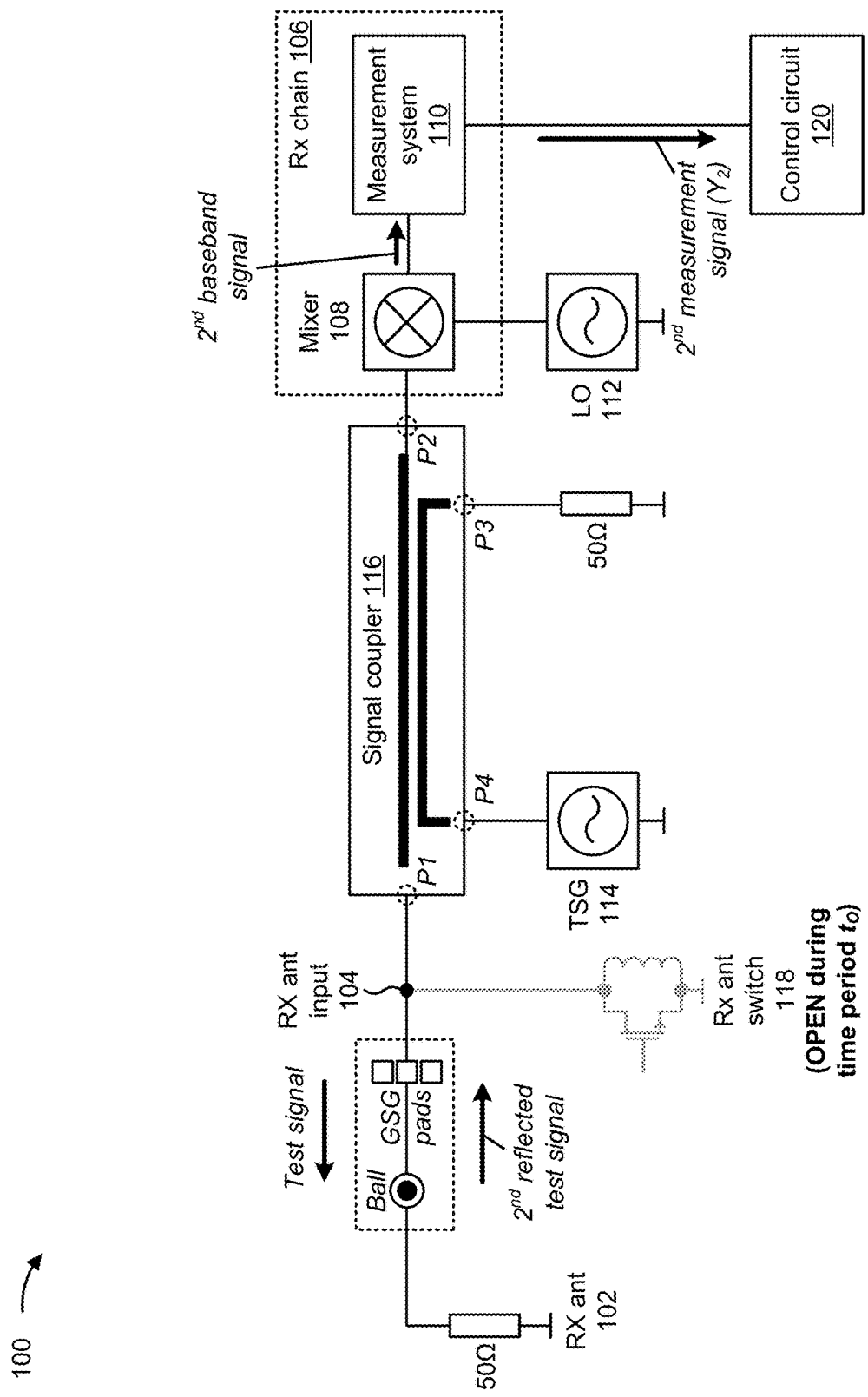
Figure 1D:
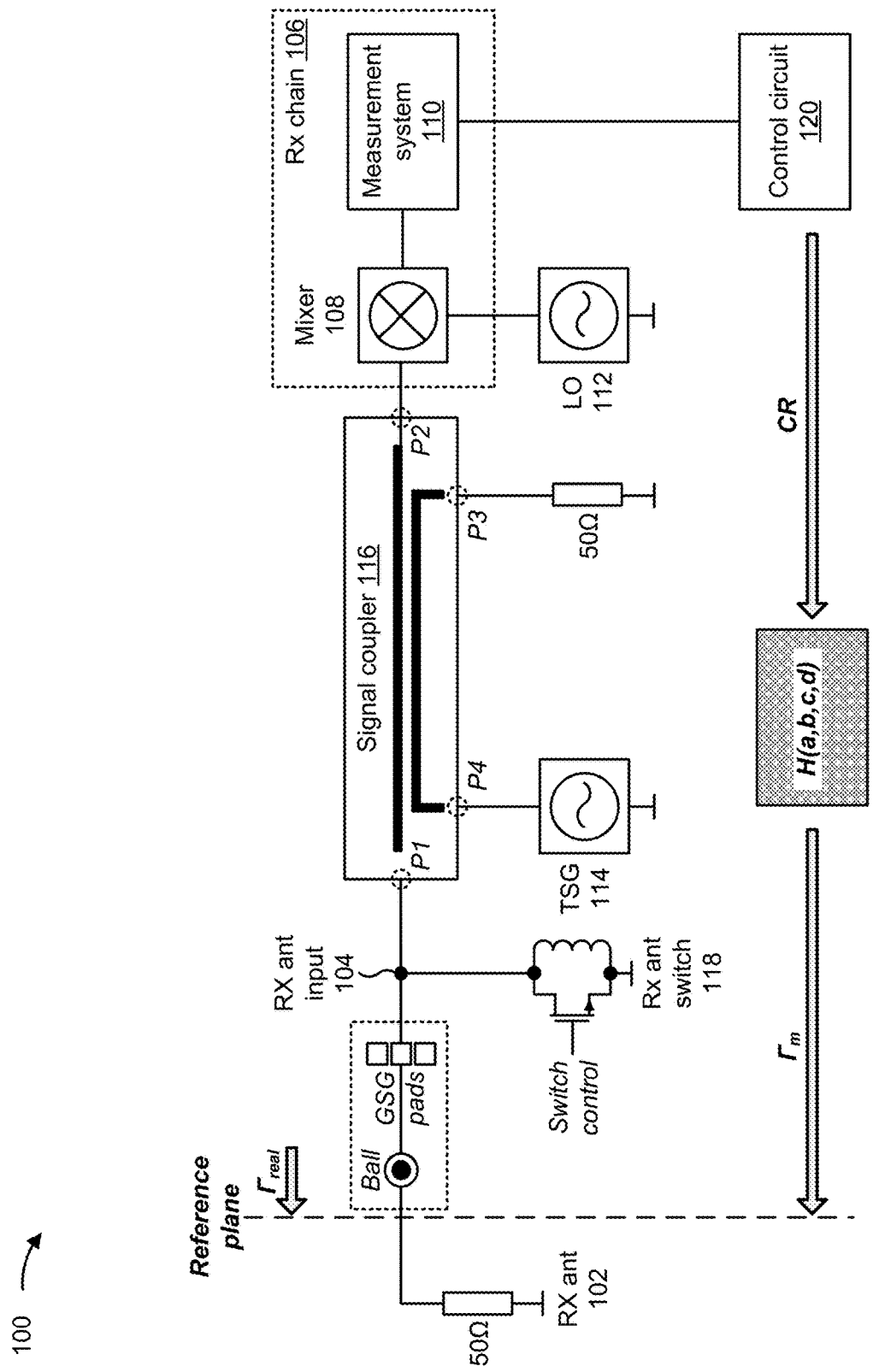

FIGS. 1B-1D are diagrams illustrating an example operation of the RF device 100. As shown in FIG. 1B, the Rx antenna switch 118 is in the first switch state (e.g., a closed switch state) during a first period of time $t_C$, which causes the Rx antenna 102 to be isolated from the Rx chain 106. Here, the TSG 114 is coupled to the port P4 of the signal coupler 116 such that the signal coupler 116 injects a test signal generated by the TSG 114 toward the Rx antenna 102. As indicated in FIG. 1B, the Rx antenna switch 118 being in the first switch state provides a connection to ground, which causes the test signal to be reflected at the Rx antenna input 104 and provided through the signal coupler 116 such that a first reflected test signal is received at the mixer 108. The mixer 108 utilizes the LO signal from the LO 112 to down-convert the first reflected test signal to generate a first baseband signal, and provides the first baseband signal to the signal processing component 110. The signal processing component 110 measures a phasor $Y_1$ of the first baseband signal and provides a first measurement signal (e.g., a signal indicating the phasor $Y_1$ of the first baseband signal) to the control circuit 120.

As shown in FIG. 1C, the Rx antenna switch 118 switches to the second switch state (e.g., an open switch state) such that the Rx antenna switch 118 is in the second switch state during a second period of time $t_O$. The signal coupler 116 injects the test signal generated by the TSG 114 toward the Rx antenna 102. Here, the Rx antenna switch 118 being in the second switch state permits the test signal to probe the Rx antenna 102 (e.g., including the connection of the Rx antenna at a ball), which causes the test signal to be reflected such that a second reflected test signal is provided through the signal coupler 116 and received at the mixer 108. The mixer 108 utilizes the LO signal from the LO 112 to down-convert the second reflected test signal to generate a second baseband signal, and provides the second baseband signal to the signal processing component 110. The signal processing component 110 measures a phasor $Y_2$ of the second baseband signal and provides a second measurement signal (e.g., a signal indicating the phasor $Y_2$ of the second baseband signal) to the control circuit 120.

With reference to FIG. 1D, the control circuit 120 may compute a complex ratio CR based on the phasor $Y_1$ of the first reflected test signal and the phasor $Y_2$ of the second reflected test signal. In some implementations, the control circuit 120 may compute the complex ratio CR according to the following formula:

$$CR = \frac{Y_2}{Y_1}$$

where the phasor $Y_1$ is the phasor of the first reflected test signal (e.g., when the Rx antenna switch 118 is in the closed switch state) and the phasor $Y_2$ is the phasor of the second reflected test signal (e.g., when the Rx antenna switch 118 is in the open switch state).

Next the control circuit 120 computes a measured reflection coefficient $\Gamma_m$ based on the complex ratio CR. The control circuit 120 may compute the measured reflection coefficient $\Gamma_m$ by applying a transfer function H to the complex ratio CR. In some implementations, the measured reflection coefficient $\Gamma_m$ is a reflection coefficient at the Rx antenna 102 as measured by the RF device 100 (e.g., as computed by the control circuit 120). The transfer function H is a transfer function applied to the complex ratio CR in order to compute the measured reflection coefficient $\Gamma_m$. As indicated in FIG. 1D, the transfer function H may be designed so that the measured reflection coefficient $\Gamma_m$ computed using the transfer function H represents a reflection coefficient at a reference plane at the Rx antenna 102 (i.e., such that the measured reflection coefficient $\Gamma_m$ represents the reflection coefficient as seen at the Rx antenna 102). In some implementations, the control circuit 120 computes the measured reflection coefficient $\Gamma_m$ according to the following formula:

$$\Gamma_m = H(a, b, c, d)(CR) = \frac{CR * a + b}{CR * c + d},$$

where a is a first parameter of the transfer function H, b is a second parameter of the transfer function H, c is a third parameter of the transfer function H, and d is a fourth parameter of the transfer function H. In some implementations, the transfer function H (e.g., values of one or more parameters of the transfer function H) may be dependent on channel characteristics of one or more components of the RF device 100 (e.g., one or more components on an Rx path from the Rx antenna input 104 to the signal processing component 110).

In a first implementation, the transfer function H may be configured to enable measurement or calibration of an RF device 100 including an LO 112 with a fixed frequency of oscillation. In such an implementation, the transfer function H can be determined by block transfer functions corresponding to one or more components of the RF device 100, such as the ball of the RF device 100 that is to provide the connection of the Rx antenna 102, the Rx antenna switch 118, the TSG 114, the signal coupler 116, or the like. Here, the transfer function H can be represented in the following format:

$$H(a, b, c, d)(CR) = \frac{CR*a + b}{CR*c + 1},$$

with the parameter a, the parameter b, and the parameter c being fixed values and the parameter d being set to a value of 1.

In a second implementation, the transfer function H may be configured to enable measurement or calibration of an RF device 100 that is capable of operating at any frequency in a particular frequency range, such as a frequency range from approximately 76 GHz to approximately 81 GHz. In some such implementations, the transfer function H can be determined by block transfer functions corresponding the one or more components of the RF device 100 as noted above, and can be represented in the following format:

$$H(a, b, c, d)(CR) = \frac{CR*a + b}{CR*c + 1},$$

with the parameter a, the parameter b, and the parameter c being frequency dependent values and the parameter d being set to a value of 1.

In another example of such an implementation, the transfer function H can be determined by block transfer functions corresponding the one or more components of the RF device 100 as noted above, and can be represented in the following format:

$$H(a, b, c, d)(CR) = \frac{CR*a + b}{CR*c + e^{j*(f_{LO} - f_{LOREF})*slope}},$$

with the parameter a, the parameter b, and the parameter c being frequency independent values and the parameter d being a frequency dependent value. Here, the parameter d may be calculated as a value corresponding to $e^{j*(f_{LO}-f_{LOREF})}$ *slope, where $f_{LO}$ is a frequency of oscillation of the LO 112 during measurement and $f_{LOREF}$ is a reference frequency of the LO 112 without a slope contribution. Notably such an implementation may be suitable for implementation of the RF device using on-chip firmware.

Figure 1E:
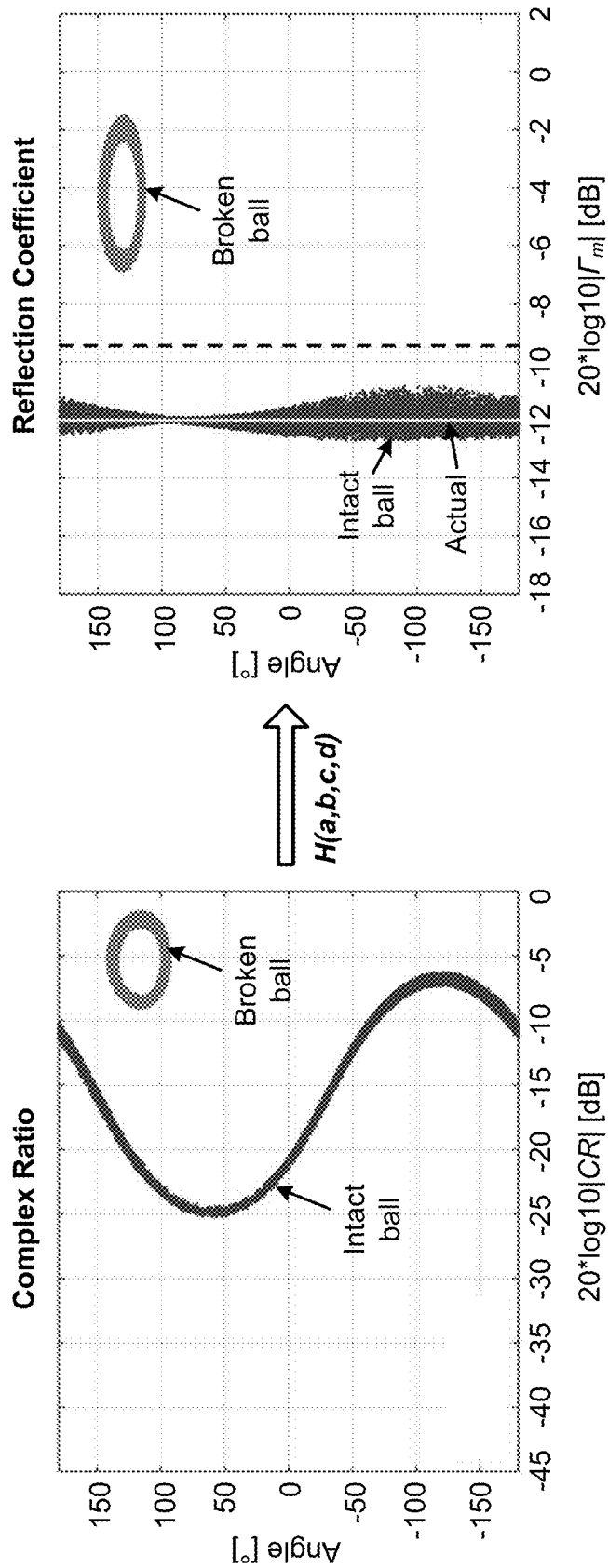

FIG. 1E includes diagrams associated with an example simulation associated with computing the measured reflection coefficient $\Gamma_m$ based on the complex ratio CR and using a transfer function H. The left diagram in FIG. 1E illustrates computed values of the complex ratio CR (shown on the horizontal axis) over a range of antenna impedance phases (shown on the vertical axis). The points identified as "intact ball" comprise simulated complex ratio CR values over the range of antenna impedance phases with a fixed absolute value of −12 decibels (dB) when no ball break at the connection of the Rx antenna 102 is present. The points identified as "broken ball" comprise simulated complex ratio CR values over the range of antenna impedance phases when a ball break is present at the connection of the Rx antenna 102.

As described above, the control circuit 120 may apply the transfer function H to the complex ratio CR in order to compute a measured reflection coefficient $\Gamma_m$ associated with the Rx antenna 102. The right diagram in FIG. 1E illustrates reflection coefficient values (shown on the horizontal axis) over the range of antenna impedance phases (shown on the vertical axis) resulting from application of the transfer function H to the complex ratio CR values shown in the left diagram of FIG. 1E. The points identified as "intact ball" comprise simulated measured reflection coefficient $\Gamma_m$ values when no ball break at the connection of the Rx antenna 102 is present. The points identified as "broken ball" comprise simulated measured reflection coefficient $\Gamma_m$ values when a ball break is present at the connection of the Rx antenna 102. The line identified as "actual" represents the actual reflection coefficient $\Gamma_{real}$ of the Rx antenna 102, which in this example is −12 dB. Notably, the simulated measured reflection coefficients $\Gamma_m$ corresponding to the intact ball scenario are comparatively closer to the actual reflection coefficient $\Gamma_{real}$, while the simulated measured reflection coefficients $\Gamma_m$ corresponding to the broken ball scenario are comparatively further from the actual reflection coefficient $\Gamma_{real}$.

Thus, as indicated by the dashed line in the right diagram of FIG. 1E, a threshold for detecting an impedance matching issue such as a broken ball can be readily determined. In this example, the threshold is set to approximately −9.5 dB. Here, the control circuit 120 may be configured with the threshold and may monitor the impedance matching of the Rx antenna 102 accordingly. For example, if the control circuit 120 computes the measured reflection coefficient $\Gamma_m$ as a value less than −9.5 dB (e.g., −12.5 dB), then the control circuit 120 may determine that impedance matching of the Rx antenna 102 is acceptable. Conversely, if the control circuit 120 computes the measured reflection coefficient $\Gamma_m$ as a value that is greater than or equal to −9.5 dB, then the control circuit 120 may determine that the Rx antenna 102 is experiencing an impedance mismatch (e.g., caused by a full ball break, a partial ball break, a physical rotation of a chip, or the like).

As indicated above, FIGS. 1A-1E are provided as an example. Other examples may differ from what is described with regard to FIGS. 1A-1E. The number and arrangement of components shown in FIGS. 1A-1E are provided as an example. In practice, there may be additional components, fewer components, different components, or differently arranged components than those shown in FIGS. 1A-1E. Furthermore, two or more components shown in FIGS. 1A-1E may be implemented within a single component, or a single component shown in FIGS. 1A-1E may be implemented as multiple, distributed components. Additionally, or alternatively, a set of components (e.g., one or more components) shown in FIGS. 1A-1E may perform one or more functions described as being performed by another set of components shown in FIGS. 1A-1E.

In some implementations, a value of a parameter of the transfer function H may be based on sets of scattering parameters associated with one or more components of the RF device 100. That is, in some implementations, a parameter of the transfer function H may be derived from a scattering parameter model that represents the one or more components of the RF device 100. For example, a value of the parameter a, a value of the parameter b, a value of the parameter c, or a value of the parameter d may be based on a set of scattering parameters associated with a connection of the Rx antenna 102, a set of scattering parameters associated with the Rx antenna 102, and a set of scattering parameters associated with the signal coupler 116. According to such an implementation, the complex ratio CR can be computed as:

$$CR = \frac{H_{SC}(H_{BS2}(\Gamma_{real}))}{H_{SC}(H_{BS1}(\Gamma_{real}))}$$

where $H_{SC}$ is a transfer function corresponding to the signal coupler 116, $H_{BS1}$ is a combined transfer function corresponding to the ball of the RF device 100 and the Rx antenna switch 118 while in the first switch state (e.g., the open switch state), $H_{BS2}$ is a combined transfer function corresponding to the ball of the RF device 100 and the Rx antenna switch 118 while in the second switch state (e.g., the closed switch state), and $\Gamma_{real}$ is the actual reflection coefficient at the Rx antenna 102. Here, the transfer function H approximates the inverse of the above function. Without further assumptions, this inversion leads to a quadratic equation that needs to be solved for $\Gamma_{real}$ from a measured complex ratio CR. With a reasonable approximation that the Rx antenna switch 118 isolates influence from the Rx antenna 102, a value of $H_{BS1}(\Gamma_{real})$ is approximately equal to $H_{BS\_closed}(0)$, and so the computation of the complex ratio CR can be simplified to:

$$CR = \frac{H_{SC}(H_{BS2}(\Gamma_{real}))}{H_{SC}(H_{BS1}(0))}.$$

This simplified equation can be algebraically inverted such that the parameters of the transfer function H can be calculated from scattering parameters associated with the set of components of the RF device 100:

$$\Gamma_m = \Gamma_{real} = \frac{CR*a+b}{CR*c+d}.$$

Additionally, or alternatively, a value of a parameter of the transfer function H may be based on a set of directivity values, a set of reflectivity values, and a set of source impedance values (e.g., which may correspond to a set of scattering parameters). For example, in a first step, a load-pull system (also referred to as an impedance tuner) can be used in conjunction with two-tier calibration procedure to set three load impedances at the reference plane of the RF device 100 for a specific RF frequency. Next, with the three load impedances, antenna impedance measurements can be performed, which provides raw data of the measured impedances. Using these measurements, calibration data in the form of a directivity D, a reflectivity R, and a source impedance S can be determined. Here, once the directivity D, the reflectivity R, and the source impedance S are known for a sample, this information can be used to correct or calibrate an input reflection coefficient of any load using the formula:

$$\Gamma_m = \frac{CR-D}{R+S(CR-D)}.$$

Here, the parameter a, the parameter b, the parameter c, and the parameter d of the transfer function H can be defined as:

$$a = \frac{1}{R-SD},$$

$$b = \frac{-D}{R-SD},$$

$$c = \frac{S}{R-SD}, \text{ and}$$

$$d = 1.$$

Figure 2A:
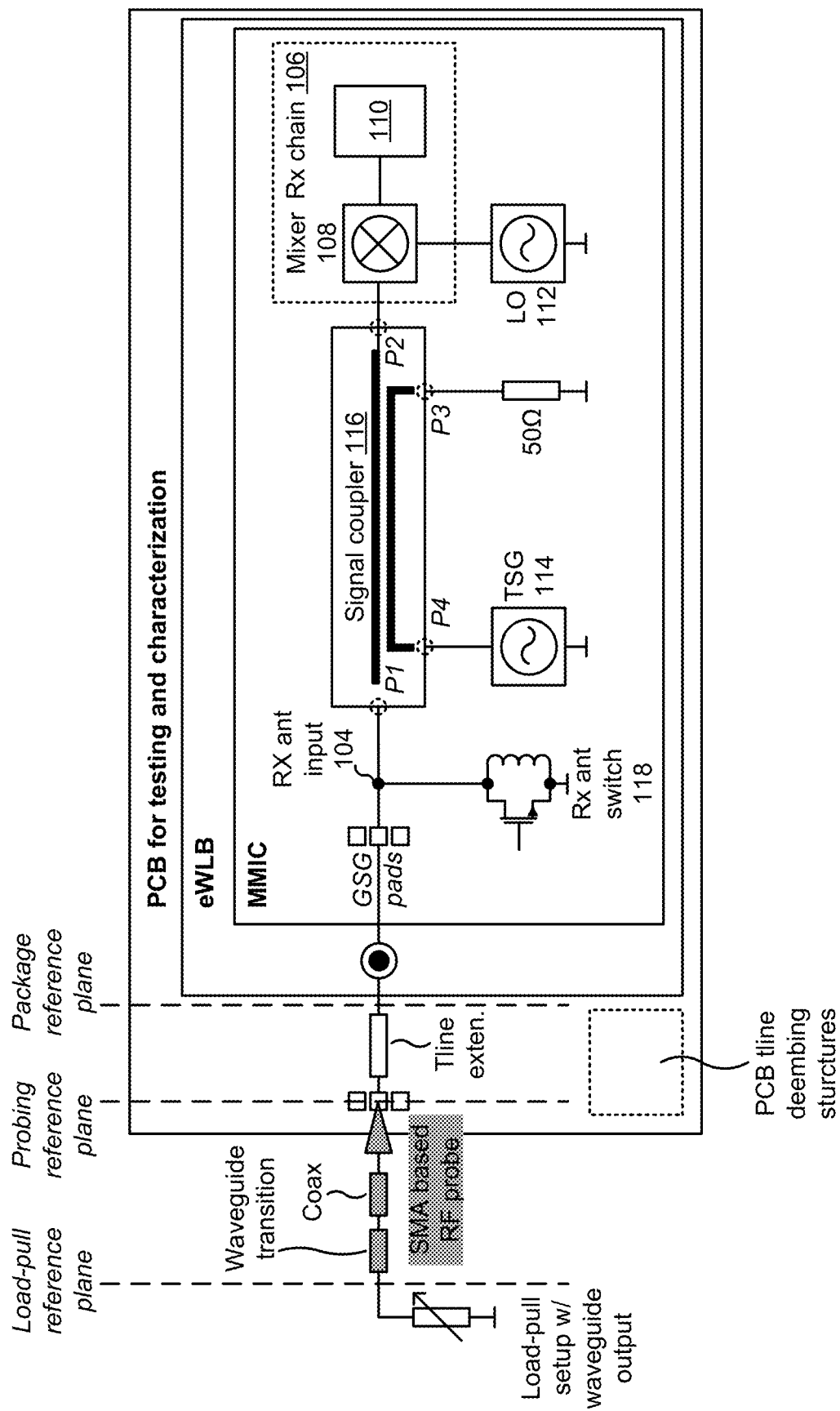
FIG. 2A is a diagram illustrating an example associated with a load-pull system used in conjunction with a two-tier calibration procedure.

FIG. 2A is a diagram illustrating an example associated with a load-pull system used in conjunction with a two-tier calibration procedure. As noted above, the load-pull system utilizes two-tier calibration. In some implementations, two-tier calibration is needed in order to de-embed measurement structures of the RF device 100 because of the difference between the load-pull reference plane and the probing reference plane illustrated in FIG. 2A.

Additionally, or alternatively, a value of a parameter of the transfer function H may be based on tuning the value of the parameter so as to minimize a cost function. In some implementations, the minimization of the cost function may be based on a scattering parameter model. For example, i (i≥1) actual reflection coefficients $\Gamma_{real}$ may be applied to the RF device 100, and i values of the complex ratio CR may be computed according to transfer function models for one or more frequencies of oscillation of the LO 112. Here, one or more parameters of the transfer function H (e.g., the parameter a, the parameter b, and the parameter c) and a slope can be tuned such that the following cost function is minimized:

$$\sum_i \left| \frac{CR_{(i)}*a+b}{CR_{(i)}*c+e^{j*(f_{LO}-f_{LOREF})*slope}} - \Gamma_{real(i)} \right|^2 = \min.$$

In this example, the transfer function H is then represented by the formula:

$$\Gamma_m = \frac{CR*a+b}{CR*c+e^{j*(f_{LO}-f_{LOREF})*slope}}.$$

Additionally, or alternatively, the minimization of the cost function may be based on load-pull measurements. For example, i actual reflection coefficients $\Gamma_{real}$ may be applied to the RF device 100 to enable i values of the complex ratio CR to be measured for one or more frequencies of oscillation of the LO 112. Here, one or more parameters of the transfer function H (e.g., the parameter a, the parameter b, and the parameter c) and the slope can be tuned such that the following cost function is minimized:

$$\sum_i \left| \frac{CR_{(i)}*a+b}{CR_{(i)}*c+e^{j*(f_{LO}-f_{LOREF})*slope}} - \Gamma_{real(i)} \right|^2 = \min.$$

In this example, the transfer function H is then represented by the formula:

$$\Gamma_m = \frac{CR*a + b}{CR*c + e^{j*(f_{LO}-f_{LOREF})*slope}}.$$

The control circuit 120 may then monitor the impedance matching of the Rx antenna 102 based the measured reflection coefficient $\Gamma_m$.

Figure 2B:
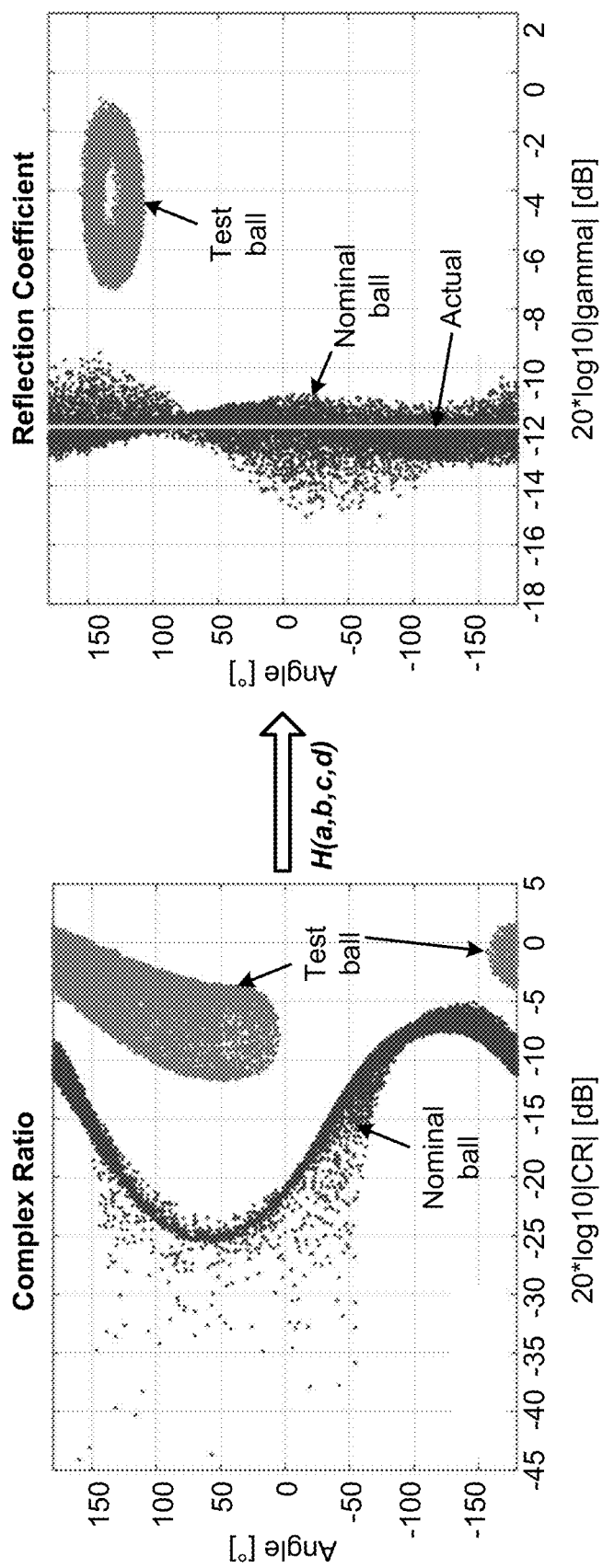
FIGS. 2B and 2C include diagrams associated with an example simulation associated with computing the measured reflection coefficient based on the complex ratio and using a transfer function for which values of the parameters were tuned so as to minimize a cost function.
Figure 2C:
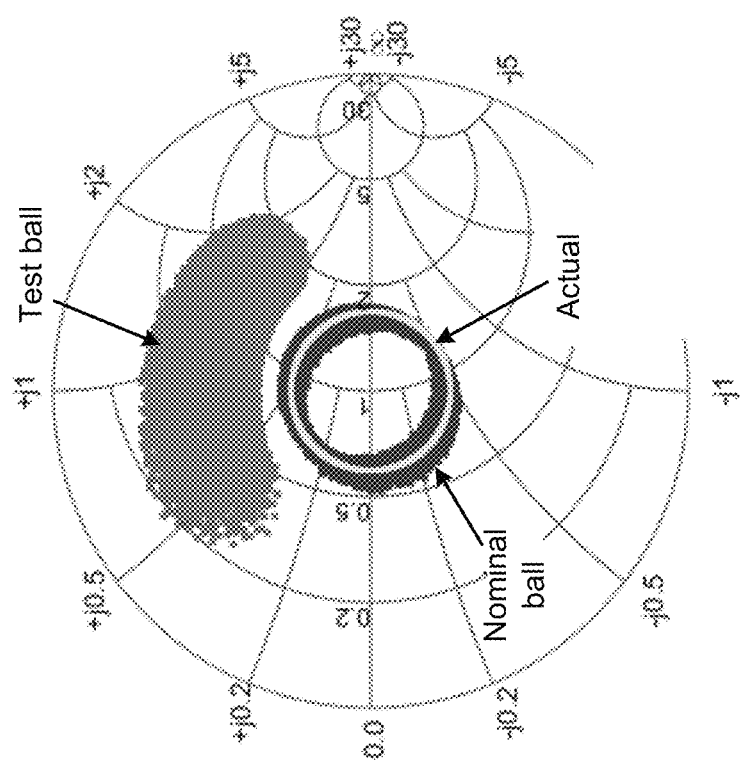

FIGS. 2B and 2C include diagrams associated with an example simulation associated with computing the measured reflection coefficient $\Gamma_m$ based on the complex ratio CR and using a transfer function H for which values of the parameters were tuned so as to minimize a cost function. The left diagram in FIG. 2B illustrates values of the complex ratio CR (shown on the horizontal axis) over a range of antenna impedance phases (shown on the vertical axis). The points identified as "intact ball" comprise complex ratio CR values over the range of antenna impedance phases (with a fixed absolute value from approximately −12 dB to approximately −14 dB) when no ball break at the connection of the Rx antenna 102 is present. The points identified as "broken ball" comprise complex ratio CR values over the range of antenna impedance phases when a ball break is present at the connection of the Rx antenna 102.

In this example, the transfer function H for which values of the parameters were tuned to minimized the cost function are applied to the complex ratios CR in order to compute a measured reflection coefficient $\Gamma_m$ associated with the Rx antenna 102. The right diagram in FIG. 2B illustrates reflection coefficient values (shown on the horizontal axis) over the range of antenna impedance phases (shown on the vertical axis) resulting from application of the transfer function H to the complex ratio CR values shown in the left diagram of FIG. 2B. The points identified as "intact ball" comprise measured reflection coefficient $\Gamma_m$ values when no ball break at the connection of the Rx antenna 102 is present. The points identified as "broken ball" comprise measured reflection coefficient $\Gamma_m$ values when a ball break is present at the connection of the Rx antenna 102. The line identified as "actual" represents the actual reflection coefficient $\Gamma_{real}$ of the Rx antenna 102, which in this example is −12 dB. Notably, the simulated measured reflection coefficients $\Gamma_m$ corresponding to the intact ball scenario are comparatively closer to the actual reflection coefficient $\Gamma_{real}$, while the simulated measured reflection coefficients $\Gamma_m$ corresponding to the broken ball scenario are comparatively further from the actual reflection coefficient Treat, which allows the control circuit 120 to readily identify an impedance mismatch, as described above (e.g., based on a threshold of, for example, −9.5 dB). FIG. 2C is a diagram illustrating the information shown in the right diagram of FIG. 2B in the form of a Smith chart.

As indicated above, FIGS. 2A-2C are provided as an example. Other examples may differ from what is described with regard to FIGS. 2A-2C.

Figure 3:
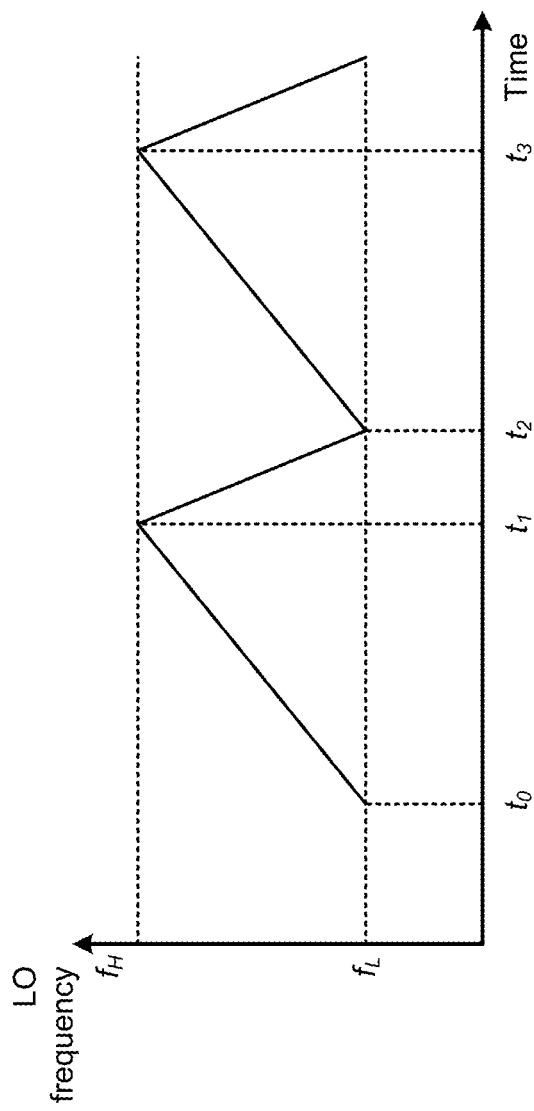
FIG. 3 is a diagram illustrating an example of frequency ramping of a local oscillator in association with performing impedance matching monitoring for an Rx antenna.

In some implementations, monitoring of the impedance of the Rx antenna 102 may be performed using a ramped frequency of oscillation of the LO 112. FIG. 3 is a diagram illustrating an example of frequency ramping of the LO 112 in association with performing impedance matching monitoring for the Rx antenna 102. With reference to FIG. 3, the LO 112 in some implementations may ramp a frequency of oscillation of the LO 112 from a first frequency $f_L$ (e.g., a comparatively lower frequency) to a second frequency $f_H$ (e.g., a comparatively higher frequency) over a first period of time (e.g., from time $t_0$ to time $t_1$) while the Rx antenna switch 118 is in the first switch state. The LO 112 may return to the first frequency $f_L$ and then ramp the frequency of oscillation of the LO 112 from the first frequency $f_L$ to the second frequency $f_H$ over a second period of time (e.g., from time $t_2$ to time $t_3$) while the Rx antenna switch 118 is in the second switch state.

In some implementations, ramping the frequency of the LO 112 results in an averaged measured reflection coefficient $\Gamma_m$ across a range of frequencies to be computed by the control circuit 120. Such an implementation may improve correlation between system performance and monitoring measurement quantity and, further, may improve robustness to interference (e.g., as compared to an LO 112 that utilizes a fixed frequency in association with computation of the measured reflection coefficient $\Gamma_m$).

As indicated above, FIG. 3 is provided as an example. Other examples may differ from what is described with regard to FIG. 3.

In some implementations, the RF device 100 may be configured to monitor impedance matching based on measured reflection coefficients $\Gamma_m$ associated with multiple Rx antennas 102 (e.g., when the RF device 100 includes multiple Rx antennas 102, each associated with a corresponding Rx path). In some such implementations, the control circuit 120 may evaluate impedance matching of a given Rx antenna 102 based on a comparing measured reflection coefficients $\Gamma_m$ associated with different Rx antennas 102. For example, with reference to FIG. 4, the control circuit 120 may in some implementations compute a first measured reflection coefficient $\Gamma_{m1}$ associated with a first Rx antenna 102 and may compute a second measured reflection coefficient $\Gamma_{m2}$ associated with a second Rx antenna 102 (e.g., in the manner described above). The control circuit 120 may compute the reflection coefficient difference $\Delta\Gamma_{m12}$ between the first measured reflection coefficient $\Gamma_{m1}$ and the second measured reflection coefficient $\Gamma_{m2}$:

$$\Delta\Gamma_{m12} = \Gamma_{m1} - \Gamma_{m2}.$$

Here, the control circuit 120 may utilize the difference $\Delta\Gamma_{m12}$ to detect an impedance mismatch (e.g., caused by a broken ball) at a given Rx antenna 102 by, for example, comparing reflection coefficient differences among multiple pairs of Rx antennas 102. In some implementations, evaluation of impedance matching of one or more Rx antennas 102 performed using reflection coefficient differences improves sensitivity of evaluation (e.g., as compared to evaluation at each single Rx antenna 102 based on a threshold).

Figure 4:
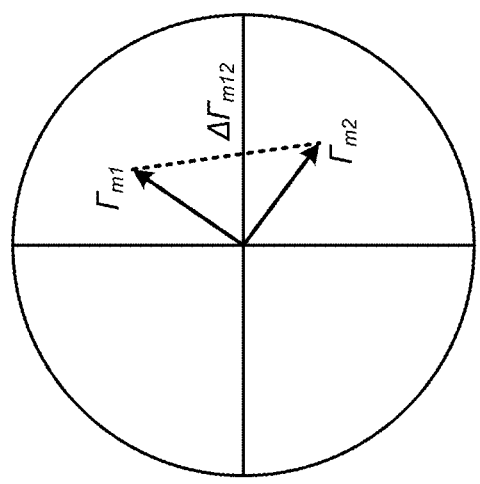
FIG. 4 is a diagram illustrating an example associated with evaluating impedance matching of an Rx antenna based on a comparing measured reflection coefficients associated with different Rx antennas.

As indicated above, FIG. 4 is provided as an example. Other examples may differ from what is described with regard to FIG. 4.

Figure 5:
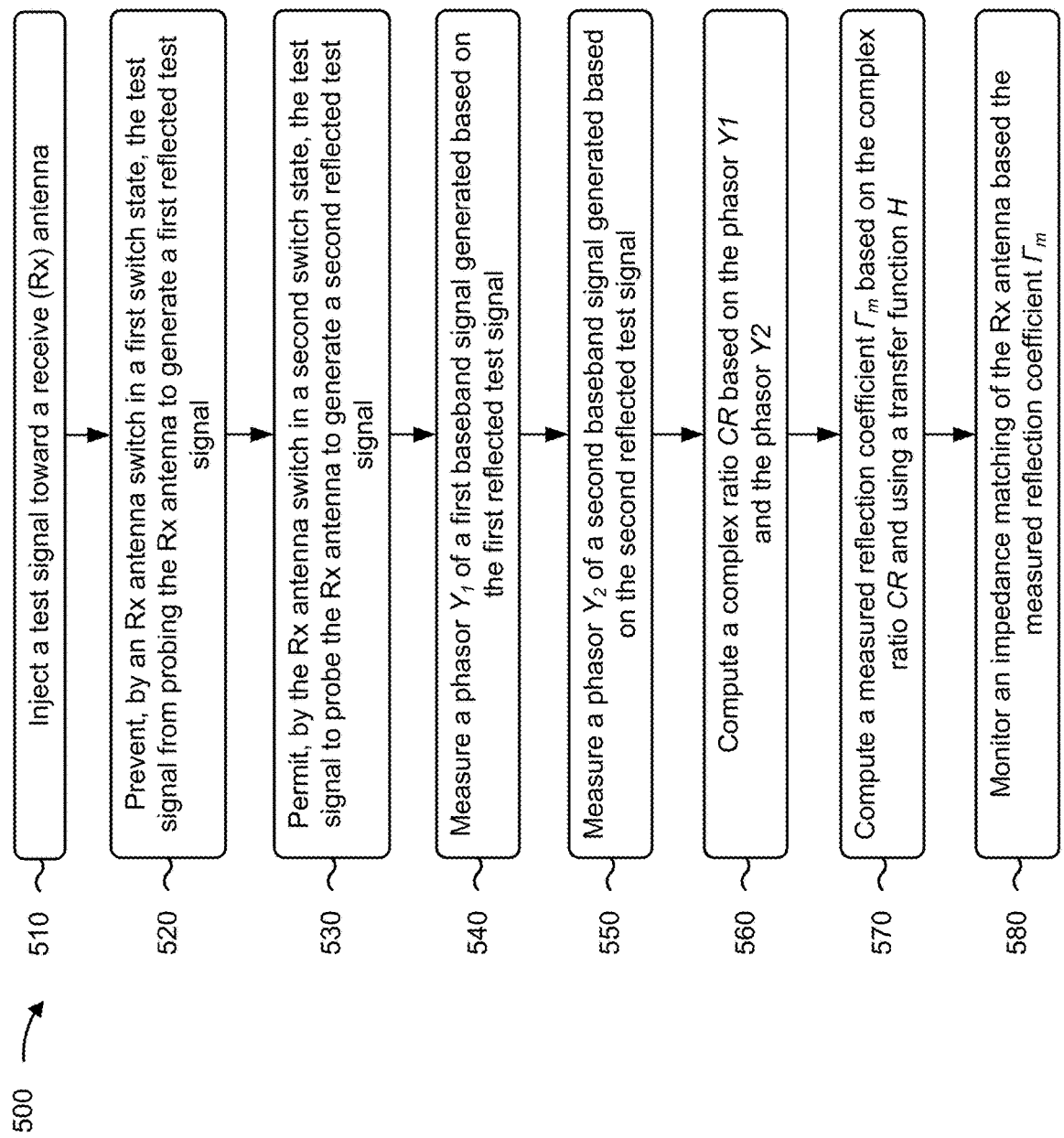
FIG. 5 is a flowchart of an example process associated with an on-chip measurement system for performing reflection coefficient measurement in association with monitoring an impedance matching of an Rx antenna.

FIG. 5 is a flowchart of an example process 500 associated with an on-chip measurement system for performing reflection coefficient measurement in association with monitoring an impedance matching of an Rx antenna. In some implementations, one or more process blocks of FIG. 5 are performed by an RF device (e.g., RF device 100). In some implementations, one or more process blocks of FIG. 5 are performed by one or more components of the RF device, such as an Rx antenna (e.g., an Rx antenna 102), Rx antenna input (e.g., an Rx antenna input 104), one or more components of an Rx chain (e.g., one or more components of the Rx chain 106), a mixer (e.g., mixer 108), a signal processing component (e.g., a signal processing component 110), an LO (e.g., LO 112), a TSG (e.g., TSG 114), a signal coupler (e.g., signal coupler 116), an Rx antenna switch (e.g., Rx antenna switch 118), or a processing component (e.g., a control circuit 120).

As shown in FIG. 5, process 500 may include injecting a test signal toward an Rx antenna (block 510). For example, the signal coupler may inject a test signal toward the Rx antenna, as described above.

As further shown in FIG. 5, process 500 may include preventing the test signal from probing the Rx antenna to generate a first reflected test signal (block 520). For example, the Rx antenna switch in a first switch state may prevent the test signal from probing the Rx antenna to generate a first reflected test signal, as described above.

As further shown in FIG. 5, process 500 may include permitting the test signal to probe the Rx antenna to generate a second reflected test signal (block 530). For example, the Rx antenna switch in a second switch state may permit the test signal to probe the Rx antenna to generate a second reflected test signal, as described above.

As further shown in FIG. 5, process 500 may include measuring a phasor $Y_1$ of a first baseband signal generated based on the first reflected test signal (block 540). For example, the signal processing component 110 may measure a phasor $Y_1$ of a first baseband signal generated based on the first reflected test signal, as described above.

As further shown in FIG. 5, process 500 may include measuring a phasor $Y_2$ of a second baseband signal generated based on the second reflected test signal (block 550). For example, the signal processing component 110 may measure a phasor $Y_2$ of a second baseband signal generated based on the second reflected test signal, as described above.

As further shown in FIG. 5, process 500 may include computing a complex ratio CR based on the phasor $Y_1$ and the phasor $Y_2$ (block 560). For example, the control circuit 120 may compute a complex ratio CR based on the phasor $Y_1$ and the phasor $Y_2$, as described above.

As further shown in FIG. 5, process 500 may include computing a measured reflection coefficient $\Gamma_m$ based on the complex ratio CR and using a transfer function H (block 570). For example, the control circuit 120 may compute a measured reflection coefficient $\Gamma_m$ based on the complex ratio CR and using a transfer function H, as described above.

As further shown in FIG. 5, process 500 may include monitoring an impedance matching of the Rx antenna based the measured reflection coefficient $\Gamma_m$ (block 580). For example, the control circuit 120 may monitor an impedance matching of the Rx antenna based the measured reflection coefficient $\Gamma_m$, as described above.

Process 500 may include additional implementations, such as any single implementation or any combination of implementations described below and/or in connection with one or more other processes described elsewhere herein.

In a first implementation, the transfer function H is based on a first parameter, a second parameter, a third parameter, and a fourth parameter, wherein the fourth parameter is set to a value of 1.

In a second implementation, the transfer function H is based on a first parameter, a second parameter, a third parameter, and a fourth parameter, wherein the first parameter, the second parameter, and the third parameter are frequency dependent values and the fourth parameter is set to a value of 1.

In a third implementation, the transfer function H is based on a first parameter, a second parameter, a third parameter c, and a fourth parameter, wherein the first parameter, the second parameter, and third the parameter are frequency independent values and the fourth parameter is a frequency dependent value.

In a third implementation, alone or in combination with one or more of the first through third implementations, process 500 includes ramping a frequency of oscillation of an LO from a first frequency to a second frequency over a first period of time while the Rx antenna switch is in the first switch state, and ramping the frequency of oscillation of the LO from the first frequency to the second frequency over a second period of time while the Rx antenna switch is in the second switch state.

In a fifth implementation, alone or in combination with one or more of the first through fourth implementations, the Rx antenna is a first Rx antenna, the measured reflection coefficient $\Gamma_m$ is a first measured reflection coefficient $\Gamma_m$, and wherein monitoring the impedance matching of the first Rx antenna comprises evaluating the impedance matching of the first Rx antenna based at least in part on a difference between the first measured reflection coefficient $\Gamma_m$ and a second measured reflection coefficient $\Gamma_m$ associated with a second Rx antenna.

In a fifth implementation, alone or in combination with one or more of the first through fourth implementations, a value of a parameter of the transfer function H is based on a set of scattering parameters associated with a connection of the Rx antenna, a set of scattering parameters associated with the Rx antenna, and a set of scattering parameters associated with the coupler.

In a sixth implementation, alone or in combination with one or more of the first through fifth implementations, a value of a parameter of the transfer function H is determined based on a set of directivity values, a set of reflectivity values, and a set of source impedance values.

In a seventh implementation, alone or in combination with one or more of the first through sixth implementations, a value of a parameter of the transfer function H is determined based on tuning the value of the parameter so as to minimize a cost function.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   a receive (Rx) antenna input to couple an Rx antenna to an Rx chain;
   a test signal generator to generate a test signal;
   a signal coupler to inject the test signal toward the Rx antenna;
   an Rx antenna switch configured to:
      cause, while in a first switch state, the Rx antenna to be isolated from an Rx chain to generate a first reflected test signal, and
      permit, while in a second switch state, the test signal to probe the Rx antenna to generate a second reflected test signal;
   the Rx chain configured to:
      measure a phasor $Y_1$ of a first baseband signal generated based on the first reflected test signal, and
      measure a phasor $Y_2$ of a second baseband signal generated based on the second reflected test signal; and
   a control circuit configured to:
      compute a complex ratio CR based on the phasor $Y_1$ and the phasor $Y_2$,
      compute a measured reflection coefficient $\Gamma_m$ based on the complex ratio CR and using a transfer function H, and
      monitor an impedance matching of the Rx antenna based on the measured reflection coefficient $\Gamma_m$.

2. The device of claim 1, wherein the transfer function H is based on a first parameter, a second parameter, a third parameter, and a fourth parameter, wherein the fourth parameter is set to a value of 1.

3. The device of claim 1, wherein the transfer function H is based on a first parameter, a second parameter, a third parameter, and a fourth parameter, wherein values of the first parameter, the second parameter, and the third parameter are frequency dependent values and the fourth parameter is set to a value of 1.

4. The device of claim 1, wherein the transfer function H is based on a first parameter, a second parameter, a third parameter, and a fourth parameter, wherein values of the first parameter, the second parameter, and the third parameter are frequency independent values and the fourth parameter is a frequency dependent value.

5. The device of claim 1, wherein the Rx chain comprises a local oscillator (LO) configured to:
   ramp a frequency of oscillation of the LO from a first frequency to a second frequency over a first period of time while the Rx antenna switch is in the first switch state, and
   ramp the frequency of oscillation of the LO from the first frequency to the second frequency over a second period of time while the Rx antenna switch is in the second switch state.

6. The device of claim 1, wherein the Rx antenna is a first Rx antenna, the measured reflection coefficient $\Gamma_m$ is a first measured reflection coefficient $\Gamma_m$, and wherein the control circuit, to monitor the impedance matching of the first Rx antenna, is configured to:
   evaluate the impedance matching of the first Rx antenna based at least in part on a difference between the first measured reflection coefficient $\Gamma_m$ and a second measured reflection coefficient $\Gamma_m$ associated with a second Rx antenna of the device.

7. The device of claim 1, wherein a value of a parameter of the transfer function H is based on a set of scattering parameters associated with a connection of the Rx antenna, a set of scattering parameters associated with the Rx antenna, and a set of scattering parameters associated with the signal coupler.

8. The device of claim 1, wherein a value of a parameter of the transfer function H is based on a set of directivity values, a set of reflectivity values, and a set of source impedance values.

9. The device of claim 1, wherein a value of a parameter of the transfer function H is based on tuning the value of the parameter so as to minimize a cost function.

10. A method, comprising:
    injecting, by a signal coupler, a test signal toward a receive (Rx) antenna;
    preventing, by an Rx antenna switch in a first switch state, the test signal from probing the Rx antenna to generate a first reflected test signal;
    permitting, by the Rx antenna switch in a second switch state, the test signal to probe the Rx antenna to generate a second reflected test signal;
    measuring, by a component of an Rx chain, a phasor $Y_1$ of a first baseband signal generated based on the first reflected test signal;
    measuring, by a component of the Rx chain, a phasor $Y_2$ of a second baseband signal generated based on the second reflected test signal;
    computing, by a control circuit, a complex ratio CR based on the phasor $Y_1$ and the phasor $Y_2$;

computing, by the control circuit, a measured reflection coefficient $\Gamma_m$ based on the complex ratio CR and using a transfer function H; and monitoring, by the control circuit, an impedance matching of the Rx antenna based on the measured reflection coefficient $\Gamma_m$.

11. The method of claim 10, wherein the transfer function H is based on a first parameter, a second parameter, a third parameter, and a fourth parameter, wherein the fourth parameter is set to a value of 1.

12. The method of claim 10, wherein the transfer function H is based on a first parameter, a second parameter, a third parameter, and a fourth parameter, wherein the first parameter, the second parameter, and the third parameter are frequency dependent values and the fourth parameter is set to a value of 1.

13. The method of claim 10 wherein the transfer function H is based on a first parameter, a second parameter, a third parameter c, and a fourth parameter, wherein values of the first parameter, the second parameter, and third the parameter are frequency independent values and the fourth parameter is a frequency dependent value.

14. The method of claim 10, further comprising:
ramping a frequency of oscillation of a local oscillator (LO) from a first frequency to a second frequency over a first period of time while the Rx antenna switch is in the first switch state, and
ramping the frequency of oscillation of the LO from the first frequency to the second frequency over a second period of time while the Rx antenna switch is in the second switch state.

15. The method of claim 10, wherein the Rx antenna is a first Rx antenna, the measured reflection coefficient $\Gamma_m$ is a first measured reflection coefficient $\Gamma_m$, and wherein monitoring the impedance matching of the first Rx antenna comprises:
evaluating the impedance matching of the first Rx antenna based at least in part on a difference between the first measured reflection coefficient $\Gamma_m$ and a second measured reflection coefficient $\Gamma_m$ associated with a second Rx antenna.

16. The method of claim 10, wherein a value of a parameter of the transfer function H is based on a set of scattering parameters associated with a connection of the Rx antenna, a set of scattering parameters associated with the Rx antenna, and a set of scattering parameters associated with the signal coupler.

17. The method of claim 10, wherein a value of a parameter of the transfer function H is determined based on a set of directivity values, a set of reflectivity values, and a set of source impedance values.

18. The method of claim 10, wherein a value of a parameter of the transfer function H is determined based on tuning the value of the parameter so as to minimize a cost function.

19. A device, comprising:
a receive (Rx) antenna input to couple an Rx antenna to an Rx chain;
a test signal generator to generate a test signal;
a signal coupler to inject the test signal toward the Rx antenna;
an Rx antenna switch configured to:
cause, while in a first switch state, the Rx antenna to be isolated from an Rx chain to generate a first reflected test signal, and
permit, while in a second switch state, the test signal to probe the Rx antenna to generate a second reflected test signal;
the Rx chain configured to:
measure a phasor $Y_1$ of a first baseband signal generated based on the first reflected test signal, and
measure a phasor $Y_2$ of a second baseband signal generated based on the second reflected test signal; and
a control circuit configured to:
apply a transfer function H to a result associated with measuring the phasor $Y_1$ and result of measuring the phasor $Y_2$, the transfer function H being dependent on channel characteristics of the device, and
monitor the Rx antenna based on a result of applying of the transfer function.

20. The device of claim 19, wherein the transfer function H is based on a first parameter, a second parameter, a third parameter, and a fourth parameter, wherein values of the first parameter, the second parameter, and the third parameter are frequency independent values and the fourth parameter is a frequency dependent value.

* * * * *